March 5, 1968 E. S. SOWA ET AL 3,372,290
ELECTRICAL GENERATOR
Filed May 11, 1965
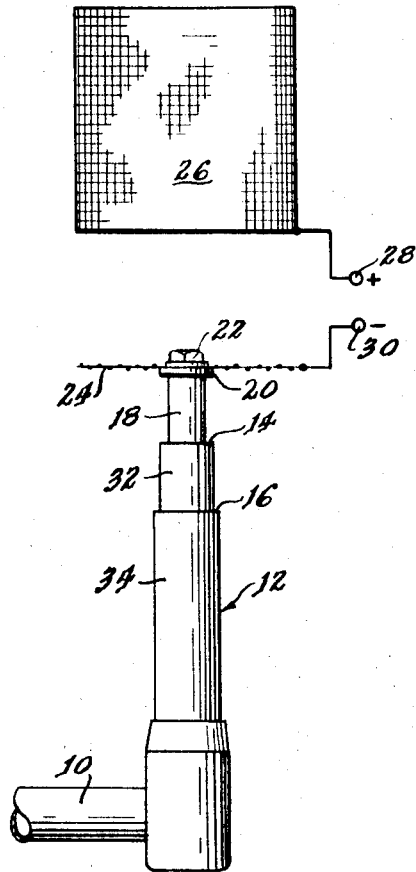
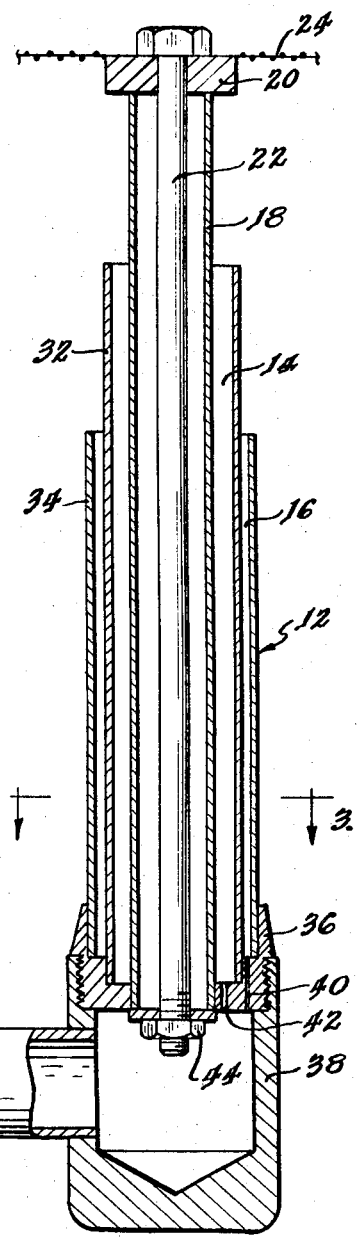
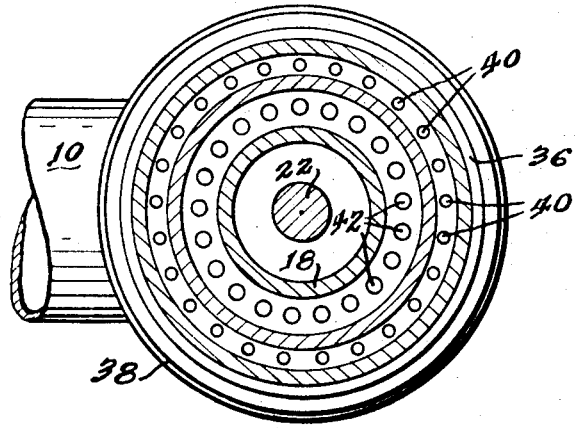
INVENTORS
Edmund S. Sowa
Charles J. Divona
Attorney

United States Patent Office 3,372,290
Patented Mar. 5, 1968

3,372,290
ELECTRICAL GENERATOR
Edmund S. Sowa, Westmont, and Charles J. Divona, Lockport, Ill., assignors to the United States of America as represented by the United States Atomic Energy Commission
Filed May 11, 1965, Ser. No. 455,020
3 Claims. (Cl. 310—5)

This invention relates to apparatus for generating electricity, and more particularly to apparatus for generating electricity from a high velocity vapor jet.

The main object of this invention is to provide novel apparatus for the generation of electrical energy from the kinetic energy of a vapor jet, and to do so without the mechanical motion of structural parts of the apparatus.

Briefly, this is accomplished by generating a stationary shock wave in a high velocity vapor jet to ionize the vapor passing through the shock wave. We have discovered that the charge resulting from the ionization of the vapor can be separated by placing a conducting screen near the shock wave region to collect electrons separated from their corresponding positive ions and then contacting the jet further downstream with a second conductor to collect the residual positive charge.

Hence, another object of this invention resides in novel apparatus for the generation of electricity by creating an area of localized ionization in a high velocity vapor jet and separating the charge generated thereby.

Still another object of this invention is to provide apparatus for generating electricity from a vapor, initially of neutral charge by causing relative motion between the vapor and a body sufficient to generate a shock wave and collecting negative charge in the shock zone and positive charge at some location downstream from the shock wave.

Other objects and advantages of this invention will become apparent to those skilled in the art from the following description when read in conjunction with the accompanying drawings which, by way of example, illustrate a specific embodiment of the invention which we have found to work satisfactorily.

In the drawings:

FIG. 1 is a diagrammatic drawing of the entire apparatus.

FIG. 2 is a detailed view, partially sectioned, of the nozzle used in FIG. 1.

FIG. 3 is a section view taken through the line 3—3 in FIG. 2.

It is well known that a shock wave can be generated by the relative motion at high velocity of a gas stream and a body, or by the relative motion of two high-velocity gas streams, or in many other ways, for example by explosion. The gas, upon passing through the shock wave, which is usually very thin, undergoes abrupt and discontinuous changes in pressure, density, velocity and temperature. These changes are irreversible, owing to some of the kinetic energy being lost as heat. This heat can create localized areas of extreme temperature sufficient even to ionize gas passing through the shock zone.

We have discovered that at least some of this kinetic energy lost by the gas passing through a shock wave can be recovered in the form of electrical energy by using the apparatus shown diagrammatically in FIGURE 1. Referring then to FIGURE 1, pressurized steam from a source (not shown) enters the apparatus at inlet 10 and is allowed to expand through a nozzle 12. The nozzle 12 is shown in more detail in FIGURE 2, but for purposes here, can be described as consisting of an inner annular chamber 14 and a concentric outer annular chamber 16. The orifice of the inner chamber 14 lies in a plane five-eighths of an inch above the plane of the orifice of the outer chamber 16.

A tubular member 18 protrudes from and forms the inner wall of the inner chamber 14. A washer 20 is fastened by a bolt 22 to the end of the protruding tubular member 18 and secured at the other end thereof. The washer 22 extends horizontally slightly into the region marked by a vertical extension of the outer annular chamber 16 thus acting to block the free movement of steam from the inner chamber 14. The distance from the orifice of the inner chamber 14 to the nearest face of the washer 22 is also five-eighths of an inch. A conducting screen 24 consisting of a fine mesh of metal wire is secured between the head of the bolt 22 and the washer 20. It should be noted that the screen 24 offers little or no resistance to the flow of steam, but serves merely to collect negative charge from the passing ionized steam.

A conducting grid 26, which for our experiment is a cylindrical basket, is arranged to contact the resulting stream formed by the commingling of the two jets and thereby collect the positive charge. A lead 28 is connected to the grid 26 for making available the positive potential and a lead 30 is connected to the screen 24 for making available the negative potential.

A detailed view of the nozzle 12 used in the specific embodiment illustrated in FIGURE 1 is shown in FIGURE 2. Referring to FIGURE 2, the three cylindrical tubes 18, 32 and 34 are placed concentrically to form the walls of the inner annular chamber 14 and outer annular chamber 16, respectively. The tubes 18, 32, and 34 are silver soldered to a tube ring 36 which in turn is fastened to a support 38. Steam is expanded through the apertures 40 into the outer chamber 16 and through apertures 42 into the inner chamber 14. The bolt 22 is fixed at the lower end of the innermost tube 18 by means of nut 44.

Tube 18 is 3.50 inches long and has an outside diameter of 0.3125 inch. Tube 32 is 2.75 inches long, has an inside diameter of 0.400 inch and has an outside diameter of 0.500 inch. Tube 34 is 2.00 inches long and has an inside diameter of 0.560 inch.

FIGURE 3 is a section view taken at 3–3 in FIGURE 2 showing apertures 42 evenly spaced on a circumference allowing steam expansion into the chamber 14. Likewise, apertures 40 are evenly spaced on a circumference allowing steam expansion into the chamber 16.

During operation of the apparatus, when a jet of steam escapes from the inner chamber 14 at a very high speed and impinges upon the washer 22, the steam is deflected at a radial angle from the tube 18. This would complicate the geometry of the charge collecting screens were it not for the action of the steam jet escaping from the outer annular chamber 16 enclosing the inner jet after it impinges on the washer 22 and forcing the resultant mixture of the two jets in a vertical stream into the basket-shaped grid 26. It is to be noted that with a sufficiently high velocity of the jet escaping from the inner chamber 14, two separate shock waves can be generated. The first shock wave will exist where the jet impinges on the washer 22, as explained above. A second shock wave is likely to exist when the radially-escaping jet collides with the outer jet escaping from the chamber 16. The respective velocities of the jets are oblique and consequently there will exist a high relative velocity between them. The existence of two shock zones through which the steam would pass obviously intensifies the ionization effect. The velocity of the enclosing outer jet must be sufficient to contain the deflected inner jet, and the higher the velocity of the outer jet, the more it will appear as a solid to the deflected jet, thereby enhancing the possibility of creating a second shock zone in the region of intersection.

We have found that the following steam velocities, measured when the steam is allowed to escape without impediment, have resulted in satisfactory operation: the unimpeded velocity of steam escaping from the inner chamber 14 is 1000 feet/sec., and the unimpeded velocity of steam escaping from the outer chamber 16 is 700 feet/sec. With these velocities, operation of the apparatus for a period of one minute has built up a potential difference between screen 24 and grid 26 of approximately 30,000 volts.

The exact mechanism that allows the charge to be separated once the vapor has been ionized by passing through the shock wave is not known for certain. However, without wishing to be bound thereby, we would suggest the following theory as a possible explanation: The steam approaching the shock wave is a gas, that is, in its molecular state having no net charge. When the gas molecules pass through the shock wave, a portion of them become ionized forming a neutral plasma with the lighter, more mobile electron remaining free and the heavier positive ion attracting a number of other neutral molecules, which might exist as a result of recombination of a positive ion and an electron, and orienting them as dipoles with the negative pole nearest to the positive ion. One positive ion would thus attract a number of neutral molecules causing condensation in the region immediately downstream from the shock wave. This is similar to the effect noticed when a charged particle passes through an expansion chamber the particle collides with gas molecules causing ionization of molecules in its path and leaves in its wake a trail of condensed vapor. See, for example, Richtmyer and Kennard, Introduction to Modern Physics, McGraw-Hill Book Co. (1942), at p. 584, referring to C. T. R. Wilson's work wherein it was estimated that an α particle passing through a cloud chamber produces 50,000 droplets per centimeter. Wilson also reports that a particle of neutral charge passing through the same cloud chamber does not produce a trail of condensed vapor droplets. We have evidence of the validity of this theory in that a flame-shaped region of condensation appears beginning at the washer 22 in FIGURE 1 and extending upward approximately an inch after the two jets have intersected.

Those skilled in the art will, of course, readily conceive equivalent embodiments of the invention not limited to the specific apparatus shown. Specifically, we refer to the fact that a difference in velocity between the jet escaping from the inner chamber 14 and the outer chamber 16 is not essential to the operation of the apparatus. Neither is the vertical displacement of the orifice of chamber 14 with respect to the orifice 16. Further, if one considers the velocity of the inner annular jet equal to the velocity of the outer annular jet and the orifice of chamber 14 in the same plane as the orifice of chamber 16, one can see that the operation is essentially that of having a single jet. Operation of such a device will be exactly analogous to the embodiment shown when one considers the resulting jet to have two regions; namely, an inner region marked by the vertical extension of washer 20 and an outer annular region enclosing the inner region marked by a vertical extension of tube 34.

The resulting operation of such a device would have the advantages described above, that is the possibility of two separate shock zones and an outer jet forcing the deflected ionized vapor through the conducting screen placed to collect negative charge. It will be further obvious to those skilled in the art that vapors other than steam, such as alcohol, will work in this invention.

Consequently, the scope of this invention should not be limited to the embodiment shown and described nor the equivalent structures described, but should be limited only by the appended claims.

The embodiments of the invention in which an exclusive property or privilege is claimed are defined as follows:

1. Apparatus for generating an electrical potential comprising:
a source of pressurized vapor;
means for forming said vapor into a high-velocity jet;
means having a surface fixed substantially normal to the flow direction of said vapor jet for abruptly deflecting said vapor jet, the relative motion of the vapor jet with respect to the deflecting surface being sufficient to cause a shock wave in the region of deflection whereby the vapor passing through said shock wave is ionized;
first conducting means located directly beyond the region of deflection and in the direction of flow of the deflected vapor for contacting said deflected vapor and collecting negative charge; and
second conducting means located further in the direction of flow than said first conducting means for contacting said vapor and collecting residual positive charge, whereby an electrical potential is built up between said first and second conducting means.

2. Apparatus for generating an electrical potential comprising:
a source of pressurized vapor;
means for forming said vapor into two jets flowing in substantially parallel directions;
means having a surface fixed in the path of one of said jets for abruptly deflecting it to intersect and commingle with the other of said jets, the relative motion of the deflected jet with respect to the deflecting surface being sufficient to generate a shock wave in the area of deflection;
a first conducting means for collecting negative charge in the area of intersection of the jets; and
a second conducting means for collecting positive charge behind the area of intersection of the jets and in the direction of flow of the commingled jets, whereby an electrical potential is built up between said first and second conducting means.

3. Apparatus for generating an electrical potential comprising:
a source of pressurized vapor;
means for forming a first jet of said vapor having a velocity at least as great as 1000 feet per second;
orifice means for forming a second jet of said vapor having a flow direction substantially parallel to said first jet at said orifice, said second jet defining a circumferential boundary of said first jet;
means having a surface defining approximately the cross-sectional area of said first jet and fixed in the path thereof for abruptly deflecting said first jet and forcing it to intersect with said second jet, the velocity of said second jet being sufficient to contain said first deflected jet and to carry it beyond the fixed surface of said deflecting means;
a first conducting means adapted to contact said first jet immediately after impinging upon said deflecting surface for collecting negative charge; and
a second conducting means adapted to contact said first and second jets after they have combined for collecting positive charge, whereby an electrical potential is built up between said first and second conducting means.

References Cited

UNITED STATES PATENTS

| 1,004,170 | 9/1911 | Jacoviello | 310—11 X |
| 3,120,621 | 2/1964 | Gunther et al. | 310—4 |
| 3,161,789 | 12/1964 | Nagamatsu | 310—11 |
| 3,350,584 | 10/1967 | Brocher et al. | 310—11 |

DAVID X. SLINEY, *Primary Examiner.*